(12) United States Patent
Ohkubo

(10) Patent No.: US 7,283,222 B1
(45) Date of Patent: Oct. 16, 2007

(54) OPTICAL MEASURING DEVICE

(75) Inventor: Kazuaki Ohkubo, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 11/737,827

(22) Filed: Apr. 20, 2007

Related U.S. Application Data

(63) Continuation of application No. PCT/JP2006/007776, filed on Apr. 12, 2006.

(51) Int. Cl.
  *G01J 1/00* (2006.01)
  *G01J 1/46* (2006.01)
(52) U.S. Cl. .................................... 356/213; 356/215
(58) Field of Classification Search ................ None
  See application file for complete search history.

(56) References Cited

U.S. PATENT DOCUMENTS

| | | | |
|---|---|---|---|
| 3,916,690 A * | 11/1975 | Brandli | 374/129 |
| 4,601,576 A | 7/1986 | Galbraith | |
| 4,740,708 A * | 4/1988 | Batchelder | 250/559.41 |
| 5,420,540 A | 5/1995 | Butler | |
| 5,430,540 A * | 7/1995 | Ohkubo | 356/236 |

FOREIGN PATENT DOCUMENTS

| | | |
|---|---|---|
| JP | 60-142238 | 7/1985 |
| JP | 5-231931 | 9/1993 |
| JP | 6-167388 | 6/1994 |
| JP | 7-146174 | 6/1995 |
| JP | 2000-258246 | 9/2000 |

OTHER PUBLICATIONS

International Search Report for parent Application No. PCT/JP2006/307776 mailed Jul. 18, 2006.

* cited by examiner

*Primary Examiner*—Michael P. Stafira
(74) *Attorney, Agent, or Firm*—Renner, Otto, Boisselle & Sklar, LLP

(57) ABSTRACT

An optical measuring device according to the present invention includes: a plane mirror (3), which has a central opening that functions as either a light entering window or a light source fitting hole (5) and an observation window 6' that enables a photodetector (6) to take measurements; and an integrating hemisphere (2), which has its center of radius of curvature defined within the central opening of the plane mirror (3) and of which the inner wall surface functions as a light diffuse reflective surface (1). The plane mirror (3) and the integrating hemisphere (2) form an integrating space inside.

6 Claims, 7 Drawing Sheets

(a)

(b)

OPTICAL MEASURING DEVICE

This is a continuation of International Application No. PCT/JP2006/307776, with an international filing date of Apr. 12, 2006, the contents of which are hereby incorporated by reference.

BACKGROUND OF THE INVENTION

1. Field of the Invention

The present invention relates to an optical measuring device that can measure the total luminous flux of a light source.

2. Description of the Related Art

Among various optical measuring devices, a total luminous flux measuring device can measure the total luminous flux of a surface emitting light source such as a display with respect to a total luminous flux standard lamp, which is a cylindrical light source. A typical conventional total luminous flux measuring device includes a perfect integrating sphere, of which the inner surface is coated with a perfectly diffuse reflective material such as barium sulfate. A sample lamp, which is the object of measurement, is arranged at the center of the integrating sphere and its luminous flux is measured through an observation window, which is located on the surface of the integrating sphere. A baffle is arranged between the observation window and the sample lamp such that the light emitted from the sample lamp does not enter the observation window directly. By measuring and comparing the luminous flux of the sample lamp to the known total luminous flux of a total luminous flux standard lamp using such a sphere photometer, the total luminous flux of the sample lamp can be obtained.

In such a sphere photometer, the sample lamp needs to be lit at the center of the integrating sphere, thus requiring a supporting member to fix the sample lamp at the center of the integrating sphere. However, since such a supporting member and the lamp itself absorb light to cause a measurement error, the supporting member is often coated with the same material as that applied onto the inner surface of the integrating sphere.

According to a proposed method, a light source for measuring self-absorption is lit on the inner surface of the integrating sphere, and the self-absorption of the supporting member and the sample lamp is calculated as the ratio of the output of the measuring device with the supporting member and the sample lamp to that of the measuring device without them. Actually, however, the lamp supporting member often serves as a wire duct to light the lamp as well and is often fixed on the integrating sphere. That is why the self-absorption ratio of the only the sample lamp is usually calculated (see JIS C7607-1991, Method for Measuring the Total Luminous Flux of Light Measuring Standard Electrical Discharge Lamp, Appendix: How to Calculate Correction Coefficient, 2. How to Define Self Absorption Correction Coefficient k2 according to Various Lamp Shapes or Sizes).

On the other hand, the spatial and spectral distributions of the light emitted from the sample lamp are different from those of the total luminous flux standard light source, and therefore, the self-absorption of the lamp supporting member and the sample lamp has a non-negligible value.

To overcome such a problem, a novel total luminous flux measuring device, including a hemisphere and a plane mirror, was proposed in Japanese Patent Application Laid-Open Publication No. 6-167388 (see FIG. 1).

The device disclosed in Japanese Patent Application Laid-Open Publication No. 6-167388 (see FIG. 1) is fabricated by providing an integrating hemisphere 2, of which the inner surface is coated with a light diffuse reflective material 1 such as barium sulfate, and closing the opening of this integrating hemisphere 2 with a plane mirror 3 as shown in FIG. 8. A hole 5 has been cut through the plane mirror 3 so as to be located at the center of curvature of the integrating hemisphere and to receive a light source 4 under measurement. By lighting the light source 4 under measurement inside the integrating hemisphere 2, a virtual image of the inner wall of the integrating hemisphere 2 and the light source 4 under measurement is formed by the plane mirror 3. As a result, the light source 4 under measurement and a virtual image thereof are both lit inside an integrating sphere having the same radius as the integrating hemisphere. In this manner, the total luminous flux of the two light sources, consisting of the light source 4 under measurement and a virtual image thereof, is measured by a photodetector 6.

In this device, the lamp supporting member (lighting jig) 8 is arranged outside of the integrating space, and therefore, the total luminous flux measured is not affected by the self-absorption produced by the lamp supporting member 8. Consequently, high measuring accuracy is realized without performing any complicated process to correct the self-absorption of the lamp supporting member 8, for example. Also, since the integrating space is only a half of a full integrating sphere, the photodetector 6 can have doubled illuminance at its light receiving window. As a result, the SNR can be increased in measuring the total luminous flux.

According to the arrangement shown in FIG. 8, however, the baffle 7 needs to cut off not only the light coming directly from the light source 4 under measurement but also the light coming directly from the virtual image of the light source 4 under measurement. That is why the size of the baffle 7 has to be more than doubled compared to the situation where only the light source 4 under measurement is lit inside a full integrating sphere as will be described later. The baffle 7 inside the integrating sphere partially cuts off the optical path of the reflected light inside the integrating sphere. However, since the baffle itself absorbs light, the measurement error would increase just like the lamp supporting member arranged in the full integrating sphere.

Hereinafter, the principle of measurement to be done using the integrating sphere and the error caused due to the self-absorption of the baffle will be described in detail.

First, the principle of measurement to be done using the integrating sphere will be described with reference to FIG. 9, which shows, by way of a planar model, how the integrating sphere works.

Suppose a light source 4 is arranged at the center of an integrating sphere with a radius r and an infinitesimal surface element A on the wall of the integrating sphere has been illuminated at a luminous intensity $I_0(\alpha)$ by the light source 4 in the direction defined by an angle $\alpha$. In that case, the illuminance $E_a$ of the infinitesimal surface element A on the integrating sphere wall is represented by the following Equation (1):

$$E_a = I_0(\alpha)/r^2 \qquad (1)$$

On the inner wall of the integrating sphere, perfectly diffuse reflection is produced at a reflectance ρ. Supposing the infinitesimal surface element A on the inner wall has an area dS, the luminous flux $\phi_a$ of the light reflected from the infinitesimal surface element A is given by the following Equation (2):

$$\phi_a = \rho \cdot E_a \cdot dS \tag{2}$$

Suppose there is an infinitesimal surface element B on the inner wall of the integrating sphere, which defines an angle θ with respect to a normal to the infinitesimal surface element A. Since the infinitesimal surface element A is a perfectly diffuse reflective surface, the luminous intensity $I_a(\theta)$ in the direction from the infinitesimal surface element A toward the infinitesimal surface element B is calculated by the following Equation (3):

$$I_a(\theta) = \phi_a \cdot \cos\theta / \pi \tag{3}$$

Since the surface B is located on the inner wall of the integrating sphere, the light directed toward the surface B with the luminous intensity $I_a(\theta)$ has an angle of incidence θ and the distance from the infinitesimal surface element A to the infinitesimal surface element B is 2r·cos θ. Therefore, at the surface B, the light with the luminous intensity $I_a(\theta)$ has the illuminance $E_{ab}$ given by the following Equation (4):

$$\begin{aligned} E_{ab} &= I_a(\theta) \cdot \cos\theta / (2r \cdot \cos\theta)^2 \\ &= \phi_a / (4\pi \cdot r^2) = \rho \cdot I_0(\alpha) \cdot dS / (4\pi \cdot r^4) \end{aligned} \tag{4}$$

As can be seen easily from Equation (4), the light reflected from the infinitesimal surface element A illuminates any portion of the inner wall of the integrating sphere with light with a uniform illuminance irrespective of the angle θ of the light that has been reflected from the infinitesimal surface element A. Since the integrating sphere has an internal surface area of $4\pi \cdot r^2$, the very small area dS can be calculated by the following Equation (5) using a very small solid angle dΩ:

$$dS = (4\pi \cdot r^2 / 4\pi) \cdot d\Omega = r^2 \cdot d\Omega \tag{5}$$

Thus, Equation (4) can be modified into the following Equation (6):

$$E_{ab} = \rho \cdot I_0(\alpha) \cdot d\Omega / (4\pi \cdot r^2) \tag{6}$$

The total luminous flux φ of the light source 4 is obtained by integrating $I_0(\alpha) \cdot d\Omega$ of Equation (6) over the entire space. Therefore, the first-order reflected light of the bundle of rays that has been emitted from the light source 4 and then reflected from the entire inner wall of the integrating sphere has an illuminance $E_{b1}$ on the surface B as represented by the following Equation (7):

$$E_{b1} = \rho \cdot \phi / (4\pi \cdot r^2) \tag{7}$$

The first-order reflected light of the bundle of rays that has been emitted from the light source 4 and then reflected from the inner wall of the integrating sphere to have the illuminance $E_{b1}$ on the surface B is further reflected from the surface B to produce second-order reflection at a reflectance ρ. Supposing the infinitesimal surface element B has an area dS, the luminous flux $\phi_{b,2}$ of the light reflected from the surface B is given by the following Equation (8):

$$\phi_{b,2} = \rho \cdot E_{b1} \cdot dS = \rho \cdot E_{b1} \cdot r^2 \cdot d\Omega \tag{8}$$

Since the surface B is a perfectly diffuse reflective surface, the luminous intensity $I_b(\theta)$ of the light reflected from the surface B at the angle θ is calculated by the following Equation (9):

$$I_b(\theta) = \phi_{b,2} \cdot \cos\theta / \pi \tag{9}$$

Supposing there is a point C that defines the angle θ with respect to the surface B, the illuminance $E_{bc}$ of the light with the luminous intensity $I_b(\theta)$ on the surface B is given by the following Equation (10):

$$E_{bc} = I_b(\theta) \cdot \cos\theta / (2r \cos\theta)^2 = \phi_{b,2} / (4\pi \cdot r^2) = \rho \cdot \{\rho \cdot \phi \cdot d\Omega\} / (4\pi \cdot r^2) \tag{10}$$

Consequently, the second-order reflected light from the surface B will illuminate any portion of the inner wall of the integrating sphere at a constant illuminance irrespective of the angle θ at which the light has been reflected from the surface B. That is to say, the second-order reflected light from the entire inner wall of the integrating sphere will have an illuminance on the surface B, which is calculated by integrating dΩ of Equation (10) over the entire space and represented by the following Equation (11):

$$E_{b2} = \rho^2 \cdot \phi / (4\pi \cdot r^2) \tag{11}$$

Supposing the light emitted from the light source 4 directly toward the surface B has a luminous intensity $I_0(\beta)$ and considering high-order reflected light that follows the first-order one, the illuminance Eb of the light on the surface B is given by the following Equation (12):

$$\begin{aligned} E_b &= I_0\{\beta\}/r^2 + \rho \cdot \phi/(4\pi \cdot r^2) + \rho^2 \cdot \phi/(4\pi \cdot r^2) + \rho^3 \cdot \phi/\{4\pi \cdot r^2\} \ldots \\ &= I_0(\beta)/r^2 + \rho \cdot \phi/\{(1-\rho) \cdot 4\pi \cdot r^2\} \end{aligned} \tag{12}$$

If the light source 4 produces a spherical spatial distribution of light, the illuminance $E_{b,0}$ of the light that has come directly from the light source 4 to have the illuminance $E_b$ on the surface B is calculated by the following Equation (13):

$$E_{b,0} = I_0(\beta)/r^2 = \phi/(4\pi \cdot r^2) \tag{13}$$

On the other hand, the illuminance $E_{b,r}$ of the light that has been reflected from the inner wall of the integrating sphere to have the illuminance $E_b$ on the surface B is calculated by the following Equation (14):

$$E_{b,r} = \rho \cdot \phi/\{(1-\rho) \cdot 4\pi \cdot r^2\} \tag{14}$$

The ratio of the illuminance $E_{b,0}$ of the light that has come directly from the light source 4 to the illuminance $E_{b,r}$ of the light that has been reflected from the inner wall of the integrating sphere is given by the following Equation (15):

$$\begin{aligned} E_{b,0} : E_{b,r} &= \phi/(4\pi \cdot r^2) : \rho \cdot \phi/\{(1-\rho) \cdot 4\pi \cdot r^2\} \\ &= 1 : \rho/(1-\rho) \end{aligned} \tag{15}$$

This ratio is determined by the reflectance ρ of the light diffuse reflective surface 1. For example, if the reflectance is approximately 95%, then the light that has come directly from the light source 4 will have an illuminance $E_{b,0}$ of approximately 5%. This value is obtained when the light source 4 produces a spherical spatial distribution of light and is subject to change significantly with the spatial distribution of the light to be produced by the light source 4 under measurement.

For that reason, the conventional integrating sphere has an observation window at the wall surface B of the integrating sphere. And if a photodetector 6 with corrected luminous efficacy is arranged at the observation window, the light that has come directly with the luminous intensity $I_0(\beta)$ from the light source 4 is cut off by the baffle 7. As a result, the photodetector 6 can measure an illuminance that is proportional to the total luminous flux of the light source 4.

Next, an error caused due to the self-absorption of the baffle will be described with reference to FIGS. 10(*a*) and 10(*b*).

Suppose the baffle 7 is arranged between the light source 4 and the photodetector 6 as shown in FIGS. 10(*a*) and 10(*b*). In that case, when looked through the light receiving window of the photodetector 6, the illumination will be absent from the p-q range on the inner wall of the integrating sphere as shown in FIG. 10(*a*). On the other hand, when looked from the light source 4, the p'-q' range on the inner wall of the integrating sphere cannot be illuminated directly as shown in FIG. 10(*b*). As a result, measurement errors are likely to be caused in both of these situations. This error will increase as the baffle 7 gets bigger. However, the larger the light source 4 under measurement, the bigger the baffle 7 has to be.

According to the arrangement shown in FIG. 8, the baffle 7 for cutting off the light that has come directly from the light source 4 under measurement is put on the plane mirror 3. In that case, the baffle 7 has to cut off the light that has come directly from the two light sources, namely, the light source 4 under measurement and its virtual image, as shown in FIG. 11. That is why in the arrangement shown in FIG. 8, the size of the baffle 7 has to be more than doubled compared to the situation where only the light source 4 under measurement is lit in the full integrating sphere, thus increasing the magnitude of measurement errors.

In order to overcome the problems described above, the present invention provides an optical measuring device that can measure the total luminous flux highly accurately with such measurement errors due to the presence of the baffle reduced significantly by eliminating the baffle.

SUMMARY OF THE INVENTION

An optical measuring device according to the present invention includes: a plane mirror, which has a central opening that functions as either a light entering window or a light source fitting hole and an observation window that enables a photodetector to take measurements; and a hemisphere, which has its center of radius of curvature defined within the central opening of the plane mirror and of which the inner wall surface functions as a light diffuse reflective surface. The plane mirror and the hemisphere form an integrating space inside.

In one preferred embodiment, the photodetector is fitted into the observation window of the plane mirror.

In another preferred embodiment, in a situation where a light source, fitted into the central opening, protrudes from the plane mirror into the integrating space to a height $L_h$, if the distance from the center of the central opening to the center of the observation window is L, the observation window has a radius $R_1$, and a photosensitive plane of the photodetector has a radius $R_2$, the photodetector is arranged $L_d$ below the observation window and satisfies $L_d > L_h(R_1 + R_2)/(L - R_1)$.

In still another preferred embodiment, no baffle is arranged in the integrating space.

In yet another preferred embodiment, the photodetector is a luminometer.

In this particular preferred embodiment, the distance from the observation window to the central opening is 65% or more of the radius of curvature of the hemisphere.

The optical measuring device of the present invention has an observation window on a plane mirror that passes the center of an integrating hemisphere, and therefore, can prevent light that has come directly from a light source from entering the observation window without providing any baffle in the integrating space. As a result, there is no self-absorption of the baffle and no vignette of reflected bundle of rays, thus reducing measurement errors due to these phenomena. Consequently, the total luminous flux can be measured at a high output and with a high SNR.

DETAILED DESCRIPTION OF PREFERRED EMBODIMENTS

The present inventors analyzed the behavior of light in an integrating space formed by an integrating hemisphere and a plane mirror as disclosed in Japanese Patent Application Laid-Open Publication No. 6-167388 (see FIG. 1) to discover that even if an observation window, which should be located on the sphere in the prior art according to its operating principle, was arranged on the plane mirror, the total luminous flux of a light source could still be measured and the baffle could be eliminated.

Figure 9:
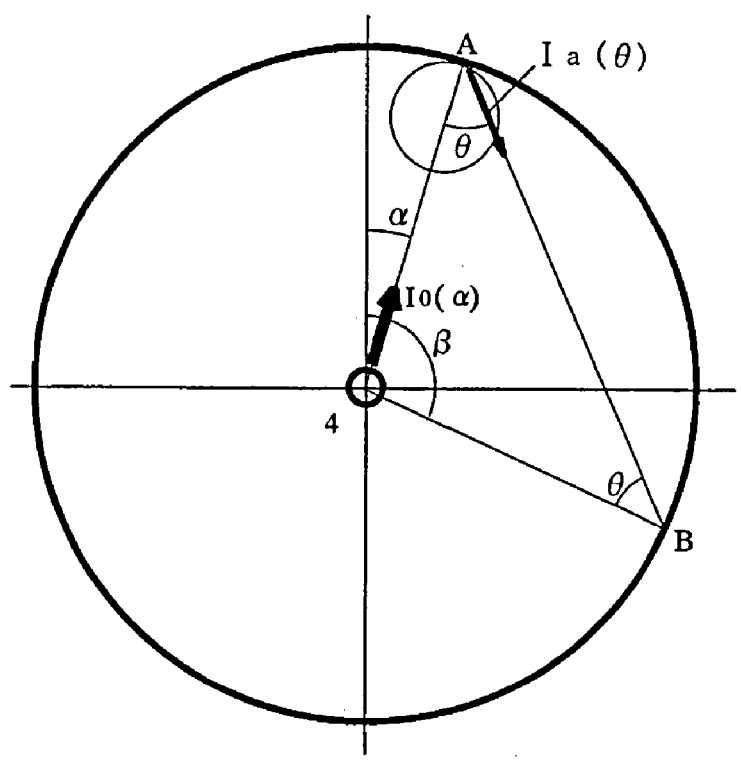
FIG. 9 shows the operating principle of a sphere photometer.
Figure 10:
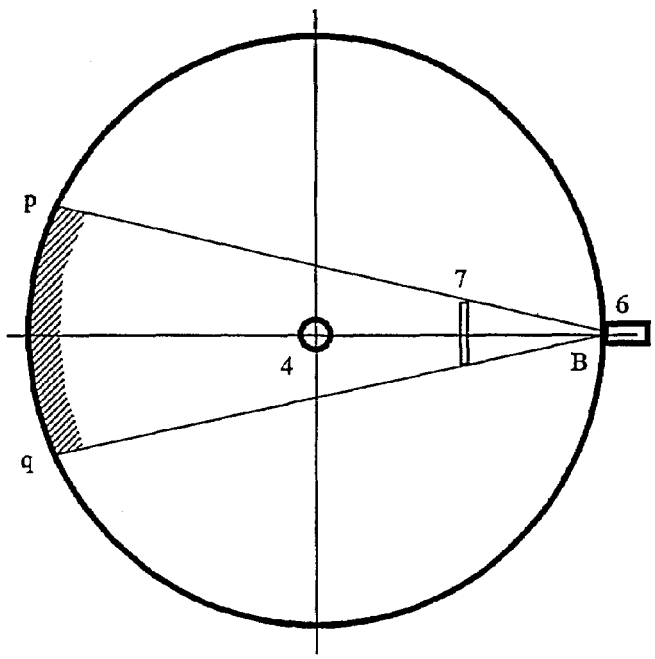
FIGS. 10(*a*) and 10(*b*) show errors to be caused when a baffle is provided inside a sphere photometer.
Figure 10:
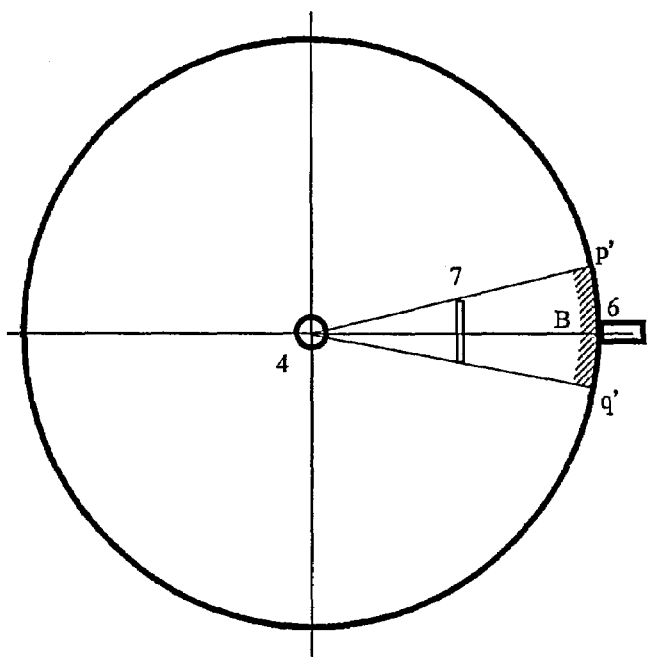
Figure 11:
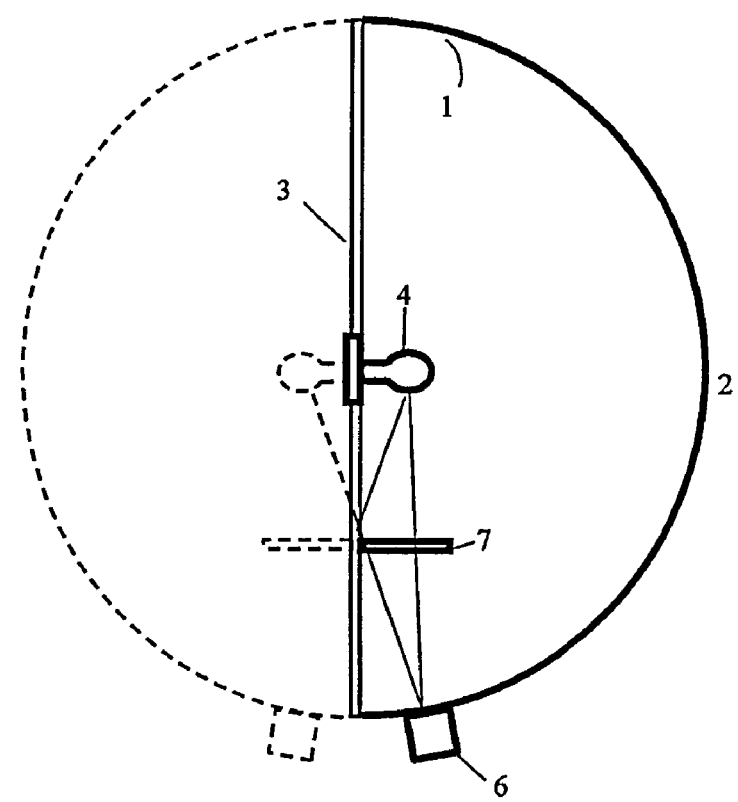
FIG. 11 shows an error to be caused when a baffle is provided in a sphere photometer with the arrangement disclosed in Japanese Patent Application Laid-Open Publication No. 6-167388 (see FIG. 1).

As already described in detail with reference to FIG. 9, the conventional principle of measuring the total luminous flux was derived by Equations on the illuminance on the inner wall surface of the integrating sphere, and has been believed to apply only to an spherical inner wall surface. However, as a result of researches, the present inventors discovered that contrary to the popular belief, the same principle also applies even to a plane mirror passing the center of a sphere. We acquired the basic idea of the present invention based on this discovery and adopts a novel arrangement in which the observation window is arranged on the plane mirror, thereby measuring the total luminous flux more accurately without using any baffle.

Hereinafter, preferred embodiments of the present invention will be described with reference to the accompanying drawings.

Embodiment 1

Figure 1:
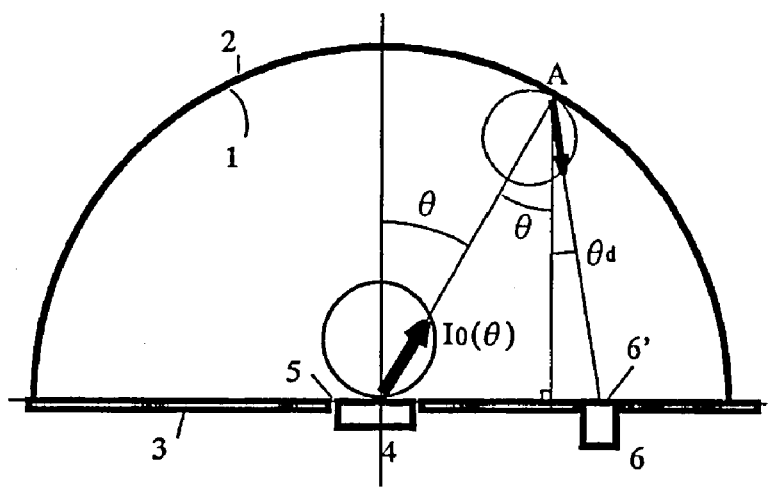
FIG. 1 is a cross-sectional view of a sphere photometer according to a first preferred embodiment of the present invention.

A first preferred embodiment of an optical measuring device according to the present invention will be described with reference to FIG. 1.

The optical measuring device of this preferred embodiment is a total luminous flux measuring device that includes an integrating hemisphere 2, of which the inner wall surface functions as a light diffuse reflective surface 1, and a plane mirror 3 to close the opening of the integrating hemisphere 2. The light diffuse reflective surface 1 is formed by either coating the inner surface of the integrating hemisphere 2 with a diffusive material that diffuses the radiation to be measured or processing the inner surface of the integrating hemisphere 2. The plane mirror 3 has a central opening that functions as either a light entering window or a light source fitting hole 5 and an observation window 6' that enables a photodetector 6 to take measurements. The center of radius of curvature of the hemisphere 2 is defined within the central opening of the plane mirror 3 and the plane mirror 3 and the integrating hemisphere 2 form a hemispherical integrating space inside. And the light source 4, of which the total luminous flux should be measured, is fitted into the light source fitting hole 5 of the plane mirror 3.

The total luminous flux measuring device of this preferred embodiment is quite different from the conventional one in the location of the photodetector 6. Specifically, although an observation window to fit a photodetector in is located on the spherical wall surface of the integrating sphere, the observation window 2 to fit the photodetector 6 in is not located on the wall surface of the integrating hemisphere 2 but arranged on the plane mirror 3 according to this preferred embodiment.

Hereinafter, the operating principle of the measuring device of this preferred embodiment will be described with reference to FIG. 1.

In this preferred embodiment, the light source 4 under measurement is supposed to be a plane light source such as an LCD backlight that has a perfectly diffuse spatial distribution of light. As shown in FIG. 1, a line connecting the center of the observation window 6' and an infinitesimal surface element A on the integrating hemisphere 2 together is supposed to define an angle $\theta_d$ with respect to a normal from the infinitesimal surface element A to the plane mirror 3. And the angle formed between a line connecting the center of the light source 4 (i.e., the center of curvature of the integrating hemisphere 2) and the infinitesimal surface element A together and a normal to the light source 4 is supposed to be $\theta$. Furthermore, if the light source 4 has a total luminous flux $\phi$ and a luminous intensity $I_0(0)$ along the normal, then the following Equation (16) is satisfied:

$$\phi = \pi \cdot I_0(0) \tag{16}$$

According to the Lambert's cosine law, the luminous intensity $I_0(\theta)$ in the direction from the light source 4 to the infinitesimal surface element A is given by the following Equation (17):

$$I_0(\theta) = I_0(0) \cdot \cos\theta = (\phi/\pi) \cdot \cos\theta = \phi \cdot \cos\theta/\pi \tag{17}$$

Supposing the integrating hemisphere has a radius of curvature of r, the illuminance $E_0(\theta)$ at the infinitesimal surface element A on the inner wall of the integrating sphere is represented by the following Equation (18):

$$E_0(\theta) = I_0(\theta)/r^2 = \phi \cdot \cos\theta/(\pi \cdot r^2) \tag{18}$$

On the light diffuse reflective surface 1 on the inner wall of the integrating hemisphere 2, perfectly diffuse reflection is produced at a reflectance $\rho$. Supposing the infinitesimal surface element A on the inner wall has an area $\Delta S$, the luminous flux $\phi_a$ of the light reflected from the infinitesimal surface element A is represented by the following Equation (19):

$$\phi_a = \rho \cdot E_0(\theta) \cdot \Delta S = \rho \cdot \Delta S \cdot \phi \cdot \cos\theta/(\pi \cdot r^2) \tag{19}$$

If the photosensitive plane of the photodetector 6 is located so as to define an angle of $\theta + \theta_d$ with respect to a normal to the infinitesimal surface element A, the luminous intensity $I_{a,d}(\theta)$ of the light with the luminous flux $\phi_a$ traveling from the infinitesimal surface element A to the photodetector 6 is calculated by the following Equation (20) because the infinitesimal surface element A is a perfectly diffuse reflective surface:

$$\begin{aligned} I_{a,d}(\theta) &= (\phi_a/\pi) \cdot \cos(\theta + \theta_d) = \phi_a \cdot \cos(\theta + \theta_d)/\pi \\ &= \rho \cdot \Delta s \cdot \phi \cdot \cos\theta \cdot \cos(\theta + \theta_d)/(\pi^2 \cdot r^2) \end{aligned} \tag{20}$$

Supposing the distance from the infinitesimal surface element A to the photosensitive plane of the photodetector 6 is $L_{ad}$, the illuminance $E_{a,d,1}$ of the first-order reflected light that has been emitted from the light source 4 with the luminous intensity $I_0(\theta)$, reflected from the infinitesimal surface element A and then detected at the photodetector 6 is given by the following Equation (21):

$$\begin{aligned} E_{a,d,1} &= I_{a,d}(\theta)/L_{ad}^2 \\ &= \rho \cdot \Delta s \cdot \phi \cdot \cos\theta \cdot \cos(\theta + \theta_d)/(\pi^2 \cdot r^2 \cdot L_{ad}^2) \end{aligned} \tag{21}$$

On the other hand, the illuminance $E_{a,f}$ of the light that has been radiated from the light source 4 in all directions and then incident on the infinitesimal surface element A is given by the following Equation (22) just like Equation (12):

$$E_{a,f} = \rho \cdot \phi/\{(1-\rho) \cdot \pi \cdot r^2\} \tag{22}$$

However, the illuminance at the infinitesimal surface element A has been doubled due to the virtual image produced by the plane mirror 3.

The luminous flux $\phi_{a,f}$ of the light reflected from the infinitesimal surface element A with the illuminance $E_{a,f}$ is given by the following Equation (23):

$$\phi_{a,f} = \rho \cdot E_{a,f} \Delta S = \rho^2 \cdot \Delta S \cdot \phi/\{(1-\rho) \cdot \pi \cdot r^2\} \tag{23}$$

The luminous intensity $I_{a,d,f}(\theta)$ of the light that has been reflected with the luminous flux $\phi_{a,f}$ from the infinitesimal surface element A toward the photodetector 6 is calculated by the following Equation (24) because the infinitesimal surface element A is a perfectly diffuse reflective surface as in Equation (20):

$$I_{a,d,f}(\theta) = \phi_{a,d,f} \cdot \cos\theta/\pi \quad (24)$$
$$= \rho^2 \cdot \Delta s \cdot \phi \cdot \cos\theta/\{(1-\rho) \cdot \pi^2 \cdot r^2\}$$

Therefore, the illuminance $E_{a,d,f}$ of the light that has been emitted from the light source 4 with the total luminous flux, reflected from the infinitesimal surface element A to be first-order reflected light, and then incident on the photodetector 6 is represented by the following Equation (25):

$$E_{a,d,f} = I_{a,d,f}(\theta)/L_{ad}^2 \quad (25)$$
$$= \rho^2 \cdot \Delta s \cdot \phi \cdot \cos\theta/\{(1-\rho) \cdot \pi^2 \cdot r^2 \cdot L_{ad}^2\}$$

That is to say, the illuminance $E_{a,d}$ on the photosensitive plane of the photodetector 6 of the light that has come from the infinitesimal surface element A on the inner wall of the integrating hemisphere 2 satisfies the following Equation (26):

$$E_{a,d} = E_{a,d,1} + E_{a,d,f} \quad (26)$$

The $E_{a,d,1}$ to $E_{a,d,f}$ ratio is given by the following Equation (27):

$$E_{a,d,1} : E_{a,d,f} = \cos(\theta+\theta_d) : \rho/(1-\rho) \quad (27)$$

The ratio of the illuminance $E_{F,d,1}$ on the photodetector 6 of the first-order reflected light that has been emitted from the light source 4 and then reflected from the entire inner wall of the integrating hemisphere 2 to the illuminance $E_{F,d,f}$ on the photodetector 6 of the diffuse reflected light that has been reflected from the entire inner wall of the integrating hemisphere 2 is equal to the value obtained by integrating $(\theta+\theta_d)$ and $\theta$ with respect to the entire space for $E_{a,d,1}$ and $E_{a,d,f}$ of Equation (27). That is why the ratio satisfies the following Equation (28):

$$E_{F,d,1} : E_{F,d,f} = 2\pi/3 : \pi \cdot \rho/(1-\rho) = 2/3 : \rho/(1-\rho) \quad (28)$$

In this preferred embodiment, $E_{F,d,1}$ is calculated on the supposition that the light source 4 is a perfectly diffuse ideal plane light source. Actually, however, $E_{F,d,1}$ depends on the spatial distribution of the light emitted from the light source 4 as can be seen from Equation (17). On the other hand, $E_{F,d,f}$ depends on the total luminous flux of the light source 4 and is not affected by its spatial distribution of light as can be seen from Equation (22). Consequently, $E_{F,d,1}$ becomes a systematic error when the total luminous flux is measured.

As can be seen from Equation (28), the ratio of $E_{F,d,1}$ to $E_{F,d,f}$ is always constant and depends on neither $\theta$ nor the angle $\theta_d$ Of the line connecting the center of the observation window 6' and the infinitesimal surface element A together. In other words, $E_{F,d,f}$ is always constant no matter where the observation window 6' is located on the plane mirror 3.

In this case, if the integrating hemisphere 2 has a reflectance $\rho$ of 95% or more, then $E_{F,d,1}$ will be 3.4% or less of $E_{F,d,f}$, which is a value in an extraordinary situation where one of the two light sources, of which the total luminous fluxes should be compared to each other, has an $E_{F,d,f}$ of zero. That is to say, this value of 3.4% is an error to be caused when the light source 4, which has such a narrow band spatial distribution of light that the luminous intensity $I_0(\theta)$ in the direction from the light source 4 to the infinitesimal surface element A has a non-zero significant value but the luminous intensity $I_0$ is zero in the other directions, is compared to a light source with a perfectly diffuse spatial distribution of light. For example, such an error is caused when the total luminous flux of a perfectly diffuse light source is compared to that of the source of a light beam condensed only on the infinitesimal surface element A. That is why an error of at most 1% would occur ordinarily.

Of these two illuminances $E_{F,d,1}$ and $E_{F,d,f}$, it is $E_{F,d,1}$ that is affected by the spatial distribution of the light source 4, while the value of $E_{F,d,f}$ is proportional to the total luminous flux irrespective of the spatial distribution of the light source 4. That is why when the total luminous fluxes of two light sources with almost the same spatial distribution of light are compared to each other, high accuracy is realized by this ideal integrating sphere in which no error is caused due to the self-absorption of the baffle 7.

Embodiment 2

A second preferred embodiment of an optical measuring device according to the present invention will be described with reference to FIG. 2.

Figure 2:
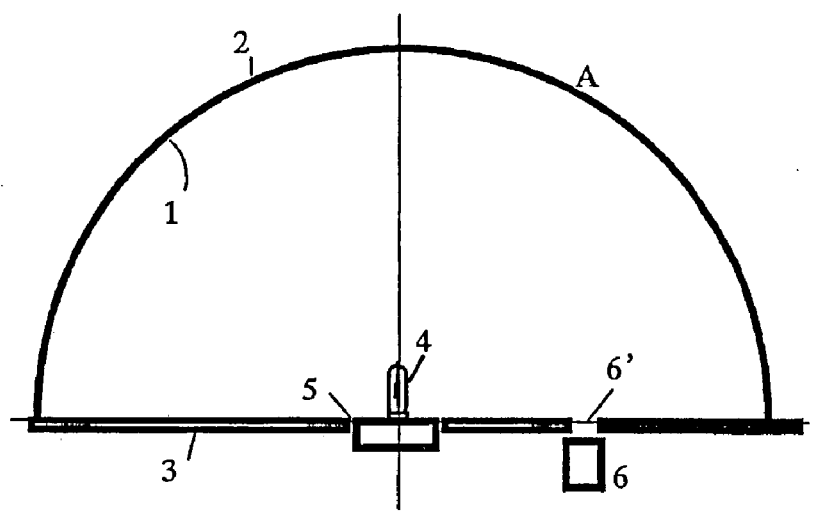
FIG. 2 is a cross-sectional view of a sphere photometer according to a second preferred embodiment of the present invention.

The photometer shown in FIG. 2 includes an integrating hemisphere 2, of which the inner wall surface functions as a light diffuse reflective surface 1, and a plane mirror 3, which is arranged so as to close the opening of the integrating hemisphere 2, including the center of curvature thereof. A light source 4, of which the total luminous flux should be measured, is fitted into a light source fitting window 5, which is arranged at the center of curvature of the integrating hemisphere 2 on the surface of the plane mirror 3. Meanwhile, a photodetector 6 is fitted into an observation window 6' on the surface of the plane mirror 3 but is arranged such that the light source 4 is invisible to the photodetector 6.

Next, the operating principle of the photometer of this preferred embodiment will be described.

The light source 4 of this preferred embodiment is a cylindrical light source such as a single-ended halogen lamp. More specifically, the filament of the light source 4 is arranged in the radial direction of the integrating hemisphere 2 perpendicularly to the plane mirror 3. Such a light source 4 has a spatial distribution of light as shown in FIG. 3.

A infinitesimal surface element A is supposed to be located at the intersection between a normal to the observation window 6' and the integrating hemisphere 2. Also, for the sake of simplicity, the center of emission of the light source 4 is supposed to be located at the center of curvature of the integrating hemisphere 2 and on the plane mirror 3.

Figure 3:
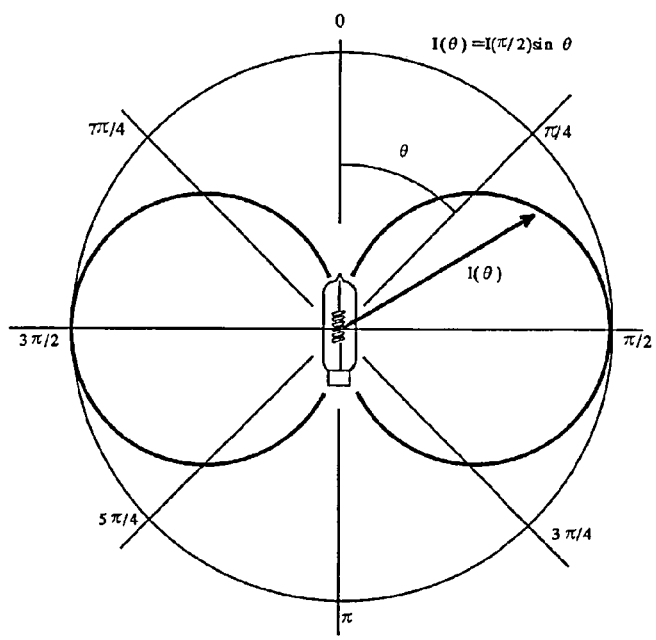
FIG. 3 shows the spatial distribution of the light produced by a cylindrical light source.

If the light source 4 has the spatial distribution of light shown in FIG. 3, the luminous intensity $I(\theta)$ at an angle $\theta$ formed between a normal to the plane mirror, which passes the center of curvature, and a line drawn from the center of curvature of the integrating hemisphere 2 to the infinitesimal surface element A is given by the following Equation (29):

$$I(\theta) = I(\pi/2) \cdot \sin\theta \quad (29)$$

The total luminous flux $\phi$ of the light source 4 is calculated by the following Equation (30):

$$\phi = \pi^2 \cdot I(\pi/2) \quad (30)$$

Therefore, the luminous intensity $I_0(\theta)$ in the direction from the light source 4 to the infinitesimal surface element A is represented by the following Equation (31):

$$I_0(\theta) = \phi \cdot \sin\theta/\pi^2 \quad (31)$$

Supposing the integrating hemisphere 2 has a radius of curvature of r, the illuminance $E_0(\theta)$ at the infinitesimal surface element A on the inner wall of the integrating sphere is represented by the following Equation (32):

$$E_0(\theta) = \phi \cdot \sin\theta/(\pi^2 \cdot r^2) \tag{32}$$

Supposing that perfectly diffuse reflection is produced at a reflectance ρ on the light diffuse reflective surface 1 on the inner wall of the integrating hemisphere and that the infinitesimal surface element A on the inner wall has an area ΔS, the luminous flux $\phi_a$ of the light reflected from the infinitesimal surface element A is represented by the following Equation (33):

$$\phi_a = \rho \cdot E_0(\theta) \cdot \Delta S = \rho \cdot \Delta S \cdot \phi \cdot \sin\theta/(\pi^2 \cdot r^2) \tag{33}$$

The photosensitive plane of the photodetector 6 is located so as to define an angle θ with respect to a normal to the infinitesimal surface element A. Thus, the luminous intensity $I_{a,d}(\theta)$ in the direction from the infinitesimal surface element A to the photodetector 6 is calculated by the following Equation (34) because the infinitesimal surface element A is a perfectly diffuse reflective surface:

$$\begin{aligned} I_{a,d}(\theta) &= \phi_a \cdot \cos\theta/\pi \\ &= \rho \cdot \Delta s \cdot \phi \cdot \cos\theta \cdot \sin\theta/(\pi^3 \cdot r^2) \end{aligned} \tag{34}$$

The distance from the infinitesimal surface element A to the photosensitive plane of the photodetector 6 is r·cos θ. Therefore, the illuminance $E_{a,d,1}$ of the first-order reflected light that has been emitted from the light source 4 with the luminous intensity I(θ), reflected from the infinitesimal surface element A and then detected at the photodetector 6 is given by the following Equation (35):

$$\begin{aligned} E_{a,d,1} &= I_{a,d}(\theta)/(r^2 \cdot \cos^2\theta) \\ &= \rho \cdot \Delta s \cdot \phi \cdot \sin\theta/(\pi^3 \cdot r^4 \cdot \cos\theta) \end{aligned} \tag{35}$$

On the other hand, the illuminance $E_{a,d,f}$ of the light that has been radiated from the light source 4 in all directions and then incident on the infinitesimal surface element A is given by the following Equation (36) just like Equation (25):

$$\begin{aligned} E_{a,d,f} &= I_{a,d,f}(\theta)/(r^2 \cdot \cos^2\theta) \\ &= \rho^2 \cdot \Delta s \cdot \phi/\{(1-\rho) \cdot \pi^2 \cdot r^4 \cdot \cos\theta\} \end{aligned} \tag{36}$$

The illuminance $E_{a,d}$ on the photosensitive plane of the photodetector 6 of the light that has come from the infinitesimal surface element A satisfies the following Equation (37):

$$E_{a,d} = E_{a,d,1} + E_{a,d,f} \tag{37}$$

The $E_{a,d,1}$ to $E_{d,f}$ ratio is given by the following Equation (38):

$$E_{a,d,1} : E_{a,d,f} = 1 : \rho \cdot \pi/\{(1-\rho) \cdot \sin\theta\} \tag{38}$$

Therefore, the following Equation (39) is satisfied:

$$E_{a,d,1} = E_{a,d,f}(1-\rho) \cdot \sin\theta/\rho \cdot \pi < E_{a,d,f}(1-\rho)/\rho \cdot \pi \tag{39}$$

The ratio of the illuminance $E_{F,d,1}$ on the photodetector 6 of the first-order reflected light that has been emitted from the light source 4 and then reflected from the entire inner wall of the integrating hemisphere 2 to the illuminance $E_{F,d,f}$ on the photodetector 6 of the diffuse reflected light that has been reflected from the entire inner wall of the integrating hemisphere 2 is equal to the value obtained by integrating θ with respect to the entire space for $E_{a,d,1}$ and $E_{a,d,f}$ of Equation (39). That is why the ratio satisfies the following Inequality (40):

$$E_{F,d,1} < E_{F,d,f}(1-\rho)/\rho \cdot \pi \tag{40}$$

This Inequality (40) is always satisfied no matter where the observation window 6' is located on the plane mirror 3. If the integrating hemisphere 2 has a reflectance ρ of 95% or more, $E_{F,d,1}$ becomes 1.7% or less of $E_{F,d,f}$.

The value of $E_{F,d,1}$ is affected by the spatial distribution of the light source 4, while the value of $E_{F,d,f}$ is proportional to the total luminous flux irrespective of the spatial distribution of the light source 4. That is why when the total luminous fluxes of two light sources with almost the same spatial distribution of light are compared to each other, high accuracy is realized by this ideal integrating sphere including no baffle 7 inside.

Compared to the primary standard lamp specified as a national standard of a total luminous flux standard lamp, a single-ended halogen lamp can be lit at a lower distribution temperature of approximately 3,000 K and can maintain a higher percentage of the luminous flux for a short time due to its halogen cycle. That is why the single-ended halogen lamp can be used effectively as a total luminous flux/spectral regular standard. If the total luminous flux of a plane light source is measured using such a single-ended halogen lamp as a total luminous flux standard, the error will be 1.7% or less, provided that the reflectance ρ on the light diffuse reflective surface 1 of the integrating hemisphere 2 is 95%.

The errors of a plane light source and a cylindrical light source are $E_{F,d,1}$ to be superposed when these light sources are supposed to be one, which are systematic errors proportional to the total luminous flux. That is why the deviation from the ratio of $\phi + E_{F,d,1}$ of the plane light source to $\phi + E_{a,d,1}$ of the cylindrical light source is supposed to be the error in such a situation and the error can be estimated as the ratio of these illuminances.

Figure 4:
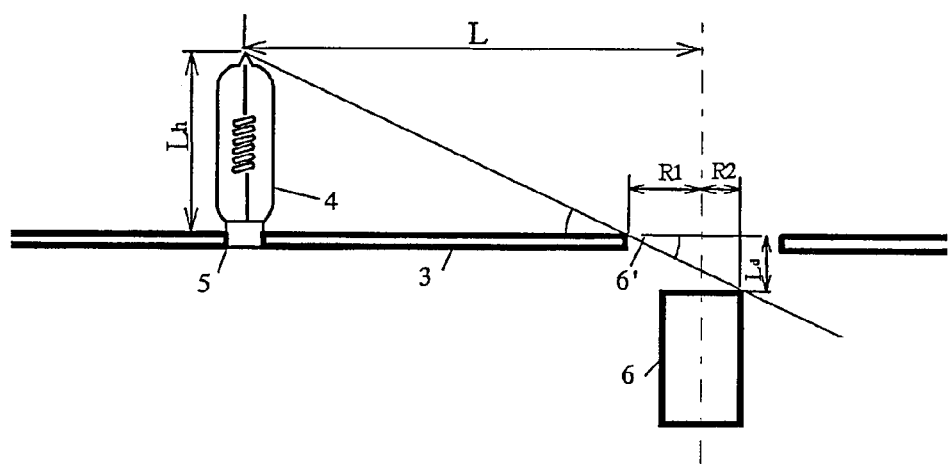
FIG. 4 shows a relative position of a photodetector 6 in a situation where there is a bundle of rays that enters an observation window 6' directly from a light source 4.

In the preferred embodiment described above, the center of emission of the light source 4 is supposed to be located at the center of curvature of the integrating hemisphere 2 and on the plane mirror 3 for the sake of simplicity. Actually, however, the light source 4 is located at a height $L_h$ on the reflective mirror 3. In that case, there is a bundle of rays that enters the observation window 6' from the light source 4 as shown in FIG. 4. And if this bundle of rays entered the photodetector 6, a measurement error would be caused.

Supposing the distance from the center of the hole 5 of the plane mirror 3, to which the light source 4 is inserted, to that of the observation window 6' is L, the radius of the observation window 6' is $R_1$, the radius of the photosensitive plane of the photodetector 6 is $R_2$, and the distance from the surface of the plane mirror 3 opposed to the integrating hemisphere 2 to the photosensitive plane of the photodetector 6 is $L_d$, the triangle formed by L−$R_1$ and $L_h$ will be analogous to the triangle formed by $R_1$+$R_2$ and $L_d$. That is why if the photodetector 6 is arranged so as to satisfy the following Inequality (41), the photodetector 6 never receives the light that has come directly from the light source 4. As a result, no measurement errors will be caused.

$$L_d > L_h(R_1+R_2)/(L-R_1) \tag{41}$$

Embodiment 3

Figure 5:
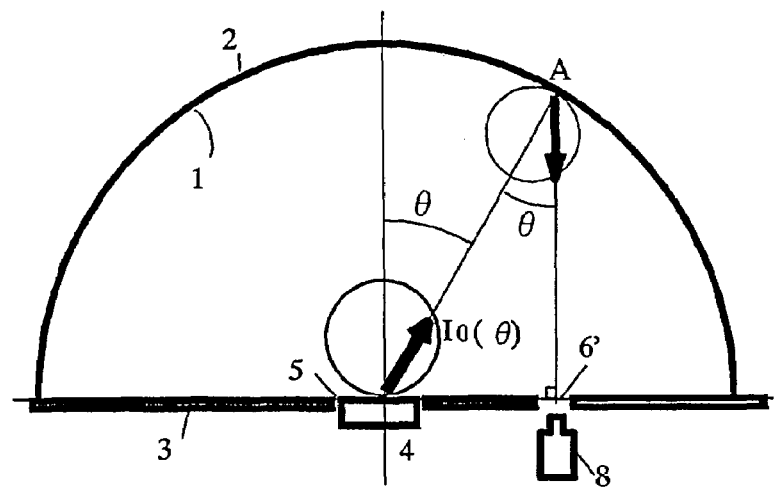
FIG. 5 is a cross-sectional view of a sphere photometer according to a third preferred embodiment of the present invention in a situation where the photometer is used to take measurements of a plane light source.

A third preferred embodiment of an optical measuring device according to the present invention will be described with reference to FIG. 5.

The device of this preferred embodiment (total luminous flux measuring device) includes an integrating hemisphere 2, of which the inner wall surface functions as a light diffuse reflective surface 1, and a plane mirror 3, which is arranged so as to close the opening of the integrating hemisphere 2, including the center of curvature thereof. A light source 4, of which the total luminous flux should be measured, is fitted into a light source fitting window 5, which is arranged at the center of curvature of the integrating hemisphere 2 on the surface of the plane mirror 3. In this preferred embodiment, a luminometer 8 measures the luminance at an infinitesimal surface element A on the inner wall of the integrating hemisphere 2 through an observation window 6' on the plane mirror 3.

Next, the operating principle of the photometer of this preferred embodiment will be described.

Suppose the center of the observation window 6' is located on a normal to the plane mirror 3 from the infinitesimal surface element A on the integrating hemisphere 2 and the light source 4 under measurement is a plane light source with a perfectly diffuse spatial distribution of light such as an LCD backlight. The angle formed between a normal to the light source 4 and a line connecting the center of the light source 4 (which is also the center of curvature of the integrating hemisphere 2) to the infinitesimal surface element A is supposed to be θ. And if the total luminous flux of the light source 4 is φ and the luminous intensity along the normal to the light source 4 is $I_0(0)$, the following Equation (42) is satisfied:

$$\phi = \pi \cdot I_0(0) \tag{42}$$

Therefore, the luminous intensity $I_0(\theta)$ in the direction from the light source 4 to the infinitesimal surface element A is represented by the following Equation (43):

$$I_0(\theta) = \phi \cdot \cos\theta/\pi \tag{43}$$

Supposing the integrating hemisphere 2 has a radius of curvature of r, the illuminance $E_0(\theta)$ of the first-order light that has come from the light source 4 (i.e., direct light) at the infinitesimal surface element A on the inner wall of the integrating sphere is represented by the following Equation (44):

$$E_0(\theta) = \phi \cdot \cos\theta/(\pi \cdot r^2) \tag{44}$$

If perfectly diffuse reflection is produced at a reflectance ρ on the light diffuse reflective surface 1 on the inner wall of the integrating hemisphere 2, the luminous emittance $M_{a,1}$ of the first-order light (i.e., the direct light) that has come from the light source 4 and then reflected from the infinitesimal surface element A is represented by the following Equation (45):

$$M_{a,1} = \rho \cdot E_0(\theta) = \rho \cdot \phi \cdot \cos\theta/(\pi \cdot r^2) \tag{45}$$

The observation window 6' is arranged so as to define an angle θ with respect to the normal to the infinitesimal surface element A, which is a perfectly diffuse reflective surface. That is why the luminance $B_{a,d,1}(\theta)$ in the direction from the infinitesimal surface element A to the observation window 6' is represented by the following Equation (46):

$$B_{a,d,1}(\theta) = M_{a,1} \cdot \cos\theta/\pi = \rho \cdot \phi \cdot \cos^2\theta/(\pi^2 \cdot r^2) \tag{46}$$

On the other hand, the illuminance $E_{a,f}$ of the light that has been radiated from the light source 4 in all directions and then incident on the infinitesimal surface element A is given by the following Equation (47) just like Equation (22):

$$E_{a,f} = \rho \cdot \phi / \{(1-\rho) \cdot \pi \cdot r^2\} \tag{47}$$

However, the illuminance at the infinitesimal surface element A is doubled due to a virtual image produced by the plane mirror 3.

The luminous emittance $M_{a,f}$ of the light reflected from the infinitesimal surface element A with the illuminance $E_{a,f}$ is represented by the following Equation (48):

$$M_{a,f} = \rho \cdot E_{a,f} = \rho^2 \cdot \phi / \{(1-\rho) \cdot \pi \cdot r^2\} \tag{48}$$

At this luminous emittance $M_{a,f}$, the luminance $B_{a,d,f}(\theta)$ in the direction from the infinitesimal surface element A to the photodetector 6 is given by the following Equation (49) because the infinitesimal surface element A is a perfectly diffuse reflective surface:

$$\begin{aligned} B_{a,d,f}(\theta) &= \phi_{a,d,f} \cdot \cos\theta/\pi \\ &= \rho^2 \cdot \phi \cdot \cos\theta / \{(1-\rho) \cdot \pi^2 \cdot r^2\} \end{aligned} \tag{49}$$

That is to say, the luminance $B_{a,d}$ in the direction from the infinitesimal surface element A on the inner wall of the integrating hemisphere 2 to the observation window 6' is represented by the following Equation (50):

$$B_{a,d} = B_{a,d,1} + B_{a,d,f} \tag{50}$$

This luminance $B_{a,d}$ is measured by the luminometer 8.

$B_{a,d,1}$ may be represented by way of $B_{a,d,f}$ as in the following Equation (51):

$$B_{a,d,1} = B_{a,d,f} \cdot \cos\theta \cdot (1-\rho)/\rho \tag{51}$$

In this case, if the infinitesimal surface element A is located at θ=75 degrees and if the integrating hemisphere 2 has an inner wall reflectance ρ of 95% or more, then $B_{a,d,1}$ will be 1.5% or less of $B_{a,d,f}$. It is $B_{a,d,1}$ that is affected by the spatial distribution of the light source 4, while the value of $B_{a,d,f}$ is proportional to the total luminous flux irrespective of the spatial distribution of the light source 4. That is why when the total luminous fluxes of two light sources with almost the same spatial distribution of light are compared to each other, high accuracy is realized by this ideal integrating sphere including no baffle 7 inside.

Furthermore, the closer to the wall of the integrating hemisphere 2 the photodetector 6 gets, the greater θ, the smaller $B_{a,d,1}$, and the smaller the error.

Figure 6:
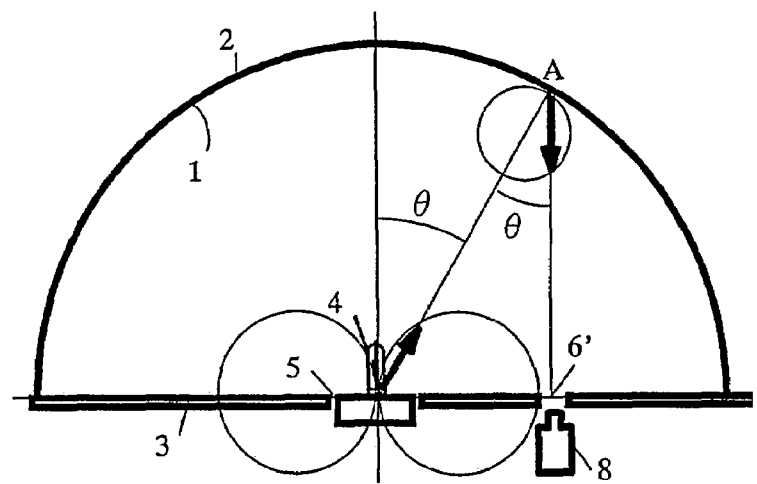
FIG. 6 is a cross-sectional view of a sphere photometer according to a third preferred embodiment of the present invention in a situation where the photometer is used to take measurements of a cylindrical light source.

FIG. 6 shows how to take measurements of a cylindrical light source using the photometer of this preferred embodiment. Hereinafter, the operation to be done in that case will be described.

Suppose the center of the observation window 6' is located on a normal to the plane mirror 3 from the infinitesimal surface element A on the integrating hemisphere 2 and the light source 4 under measurement is a plane light source with a perfectly diffuse spatial distribution of light such as an LCD backlight.

The light source 4 is a cylindrical light source such as a single-ended halogen lamp. More specifically, the filament of the light source 4 is arranged in the radial direction of the integrating hemisphere perpendicularly to the plane mirror 3. Such a light source 4 has a spatial distribution of light as shown in FIG. 3.

For the sake of simplicity, the center of emission of the light source 4 is supposed to be located at the center of curvature of the integrating hemisphere 2 and on the plane mirror 3. Supposing the angle defined by the line connecting the center of curvature of the integrating hemisphere 2 to the infinitesimal surface element A is θ, the luminous intensity I(θ) in that direction is given by the following Equation (52):

$$I(\theta) = I(\pi/2) \cdot \sin\theta \quad (52)$$

The total luminous flux φ of the light source 4 is calculated by the following Equation (53):

$$\phi = \pi^2 \cdot I(\pi/2) \quad (53)$$

Therefore, the luminous intensity $I_0(\theta)$ in the direction from the light source 4 to the infinitesimal surface element A is represented by the following Equation (54):

$$I_0(\theta) = \phi \cdot \sin\theta/\pi^2 \quad (54)$$

Supposing the integrating hemisphere 2 has a radius of curvature of r, the illuminance $E_0(\theta)$ at the infinitesimal surface element A on the inner wall of the integrating sphere is represented by the following Equation (55):

$$E_0(\theta) = \phi \cdot \sin\theta/(\pi^2 \cdot r^2) \quad (55)$$

If perfectly diffuse reflection is produced at a reflectance ρ on the light diffuse reflective surface 1 on the inner wall of the integrating hemisphere 2, the luminous emittance $M_{a,1}$ of the first-order light (i.e., the direct light) that has come from the light source 4 and then reflected from the infinitesimal surface element A is represented by the following Equation (56):

$$M_{a,1} = \rho \cdot E_0(\theta) = \rho \cdot \phi \cdot \sin\theta/(\pi^2 \cdot r^2) \quad (56)$$

The observation window 6' is arranged so as to define an angle θ with respect to the normal to the infinitesimal surface element A, which is a perfectly diffuse reflective surface. That is why the luminance $B_{a,d,1}(\theta)$ in the direction from the infinitesimal surface element A to the observation window 6' is represented by the following Equation (57):

$$B_{a,d,1}(\theta) = M_{a,1} \cdot \cos\theta/\pi \quad (57)$$
$$= \rho \cdot \phi \cdot \sin\theta \cdot \cos\theta/(\pi^3 \cdot r^2)$$

On the other hand, the illuminance $E_{a,f}$ of the light that has been radiated from the light source 4 in all directions and then incident on the infinitesimal surface element A is given by the following Equation (58) just like Equation (22):

$$E_{a,f} = \rho \cdot \phi/\{(1-\rho) \cdot \theta \cdot r^2\} \quad (58)$$

However, the illuminance at the infinitesimal surface element A is doubled due to a virtual image produced by the plane mirror 3.

The luminous emittance $M_{a,f}$ of the light reflected from the infinitesimal surface element A with the illuminance $E_{a,f}$ is represented by the following Equation (59):

$$M_{a,f} = \rho \cdot E_{a,f} = \rho^2 \cdot \phi/\{(1-\rho) \cdot \pi \cdot r^2\} \quad (59)$$

At this luminous emittance $M_{a,f}$, the luminance $B_{a,d,f}(\theta)$ in the direction from the infinitesimal surface element A to the photodetector 6 is given by the following Equation (60) because the infinitesimal surface element A is a perfectly diffuse reflective surface:

$$B_{a,d,f}(\theta) = \phi_{a,d,f} \cdot \cos\theta/\pi \quad (60)$$
$$= \rho^2 \cdot \phi \cdot \cos\theta/\{(1-\rho) \cdot \pi^2 \cdot r^2\}$$

That is to say, the luminance $B_{a,d}$ in the direction from the infinitesimal surface element A on the inner wall of the integrating hemisphere 2 to the observation window 6' is represented by the following Equation (61):

$$B_{a,d} = B_{a,d,1} + B_{a,d,f} \quad (61)$$

This luminance $B_{a,d}$ is measured by the luminometer 8.

$B_{a,d,1}$ may be represented by way of $B_{a,d,f}$ as in the following Equation (62):

$$B_{a,d,1} = B_{a,d,f} \cdot \sin\theta \cdot (1-\rho)/(\pi \cdot \rho) \quad (62)$$

In this case, if the observation window 6' is located at θ=30 degrees and if the reflectance ρ is 95% or more, then $B_{a,d,1}$ will be 1% or less of $B_{a,d,f}$. It is $B_{a,d,1}$ that is affected by the spatial distribution of the light source 4, while the value of $B_{a,d,f}$ is proportional to the total luminous flux irrespective of the spatial distribution of the light source 4. That is why when the total luminous fluxes of two light sources with almost the same spatial distribution of light are compared to each other, high accuracy is realized by this ideal integrating sphere including no baffle 7 inside.

This value of 1% is the biggest error to be caused when a light source with such a narrow band spatial distribution of light that the luminous intensity $I_0(\theta)$ in the direction from the light source 4 to the point A becomes zero is subjected to measurement in comparison with a light source with the perfectly diffuse spatial distribution of light described above. The closer to the light source 4 the observation window 6' gets, the smaller θ, the greater this ratio, and the smaller the error.

Figure 7:
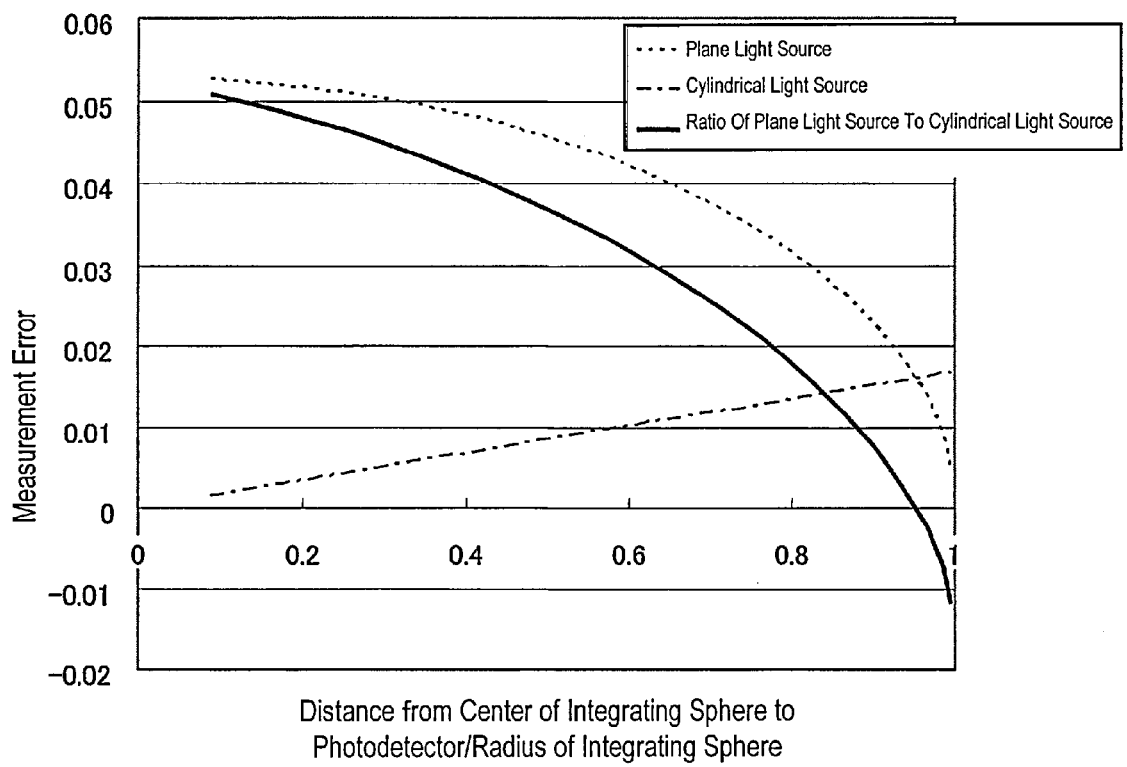
FIG. 7 shows measurement errors using the location of an observation window as a parameter in a situation where the total luminous flux of a plane light source is measured with a cylindrical light source regarded as a total luminous flux standard.
Figure 8:
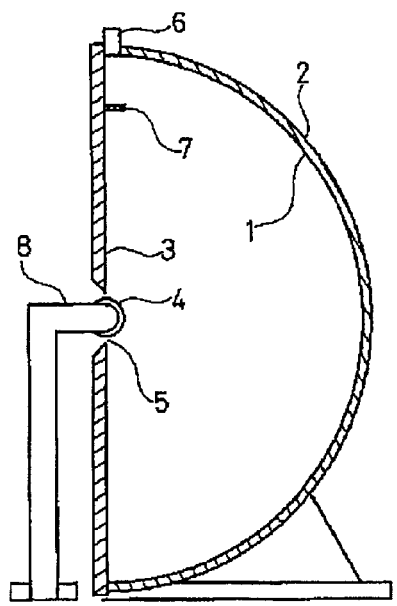
FIG. 8 shows the arrangement of the photometer disclosed in Japanese Patent Application Laid-Open Publication No. 6-167388 (see FIG. 1).

FIG. 7 shows errors to be caused when the total luminous flux of a plane light source is measured with a single-ended halogen lamp used as a total luminous flux standard. The integrating hemisphere 2 is supposed to have a reflectance ρ of 95% on the light diffuse reflective surface 1. The errors of the plane light source and a cylindrical light source are $B_{a,d,1}$ to be superposed when these light sources are supposed to be one and are systematic errors that are proportional to the total luminous flux. That is why the deviation of the ratio of $B_{a,d}$ of the plane light source to $B_{a,d,1}$ of the cylindrical light source from one is regarded as representing the error in this case. The abscissa represents the value obtained by normalizing the distance from the center of the integrating hemisphere to the observation window 6' with the radius of the integrating hemisphere.

As can be seen from FIG. 7, if the plane light source is subjected to measurements by reference to the cylindrical light source, the measurements can be done with the error reduced to 3% or less by arranging the observation window 6' at a distance corresponding to 65% or more of the radius of the integrating hemisphere 2 as measured from the center of the integrating hemisphere 2.

The optical measuring device of the present invention has an observation window on a plane mirror that passes the center of an integrating hemisphere, and therefore, can prevent light that has come directly from a light source from entering the observation window without providing any baffle in the integrating space. As a result, there is no self-absorption of the baffle and no vignette of reflected bundle of rays, thus reducing measurement errors due to these phenomena. Therefore, the optical measuring device of the present invention can be used effectively in estimating the total luminous flux of not just a general illumination source like a light bulb or a fluorescent lamp but also an LCD backlight, a light source system for electronic billboards, or a self-emitting flat display such as a PDP.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical measuring device comprising:
    a plane mirror, which has a central opening that functions as either a light entering window or a light source fitting hole and an observation window that enables a photodetector to take measurements; and
    a hemisphere, which has its center of radius of curvature defined within the central opening of the plane mirror and of which the inner wall surface functions as a light diffuse reflective surface,
    wherein the plane mirror and the hemisphere form an integrating space inside.

2. The optical measuring device of claim 1, wherein the photodetector is fitted into the observation window of the plane mirror.

3. The optical measuring device of claim 1, wherein in a situation where a light source, fitted into the central opening, protrudes from the plane mirror into the integrating space to a height $L_h$, if the distance from the center of the central opening to the center of the observation window is L, the observation window has a radius $R_1$, and a photosensitive plane of the photodetector has a radius $R_2$,
    the photodetector is $L_d$ below the observation window and satisfies $L_d > L_h(R_1+R_2)/(L-R_1)$.

4. The optical measuring device of claim 1, wherein no baffle is arranged in the integrating space.

5. The optical measuring device of claim 1, wherein the photodetector is a luminometer.

6. The optical measuring device of claim 5, wherein the distance from the observation window to the central opening is 65% or more of the radius of curvature of the hemisphere.

* * * * *

UNITED STATES PATENT AND TRADEMARK OFFICE
CERTIFICATE OF CORRECTION

PATENT NO. : 7,283,222 B1  
APPLICATION NO. : 11/737827  
DATED : October 16, 2007  
INVENTOR(S) : Kazuaki Ohkubo It is certified that error appears in the above-identified patent and that said Letters Patent is hereby corrected as shown below:

Title Page, Item (63) Related U.S. Application Data, "PCT/JP2006/007776" should read -- PCT/JP2006/307776 --.

Signed and Sealed this

Twenty-ninth Day of April, 2008

JON W. DUDAS  
*Director of the United States Patent and Trademark Office*